United States Patent [19]
Korosue

[11] 4,112,778
[45] Sep. 12, 1978

[54] VARIABLE SPEED POWER TRANSMISSION
[76] Inventor: Akira Korosue, 19-6, Tashiro-cho, Nishinomiya, Hyogo, Japan
[21] Appl. No.: 746,341
[22] Filed: Dec. 1, 1976
[30] Foreign Application Priority Data
Dec. 2, 1975 [JP] Japan ............................ 50/145792
[51] Int. Cl.² .......................................... F16H 29/04
[52] U.S. Cl. .................................. 74/117; 74/571 M
[58] Field of Search ................................ 74/117, 571
[56] References Cited
U.S. PATENT DOCUMENTS
191,453  5/1877  Mason ................................ 74/571

2,864,259  12/1958  Troeger ................................ 74/117
3,364,759   1/1968  Ishioka ................................ 74/117

FOREIGN PATENT DOCUMENTS
250  2/1926  Italy ................................ 74/117

Primary Examiner—Benjamin W. Wyche
Assistant Examiner—Wesley S. Ratliff
Attorney, Agent, or Firm—Auslander & Thomas

[57] ABSTRACT

This invention relates to a variable speed power transmission provided with rotary units which are mounted on an input axis and an output axis in parallel with each other, with a phase angle difference therebetween so as to maintain static balance on the whole.

1 Claim, 17 Drawing Figures

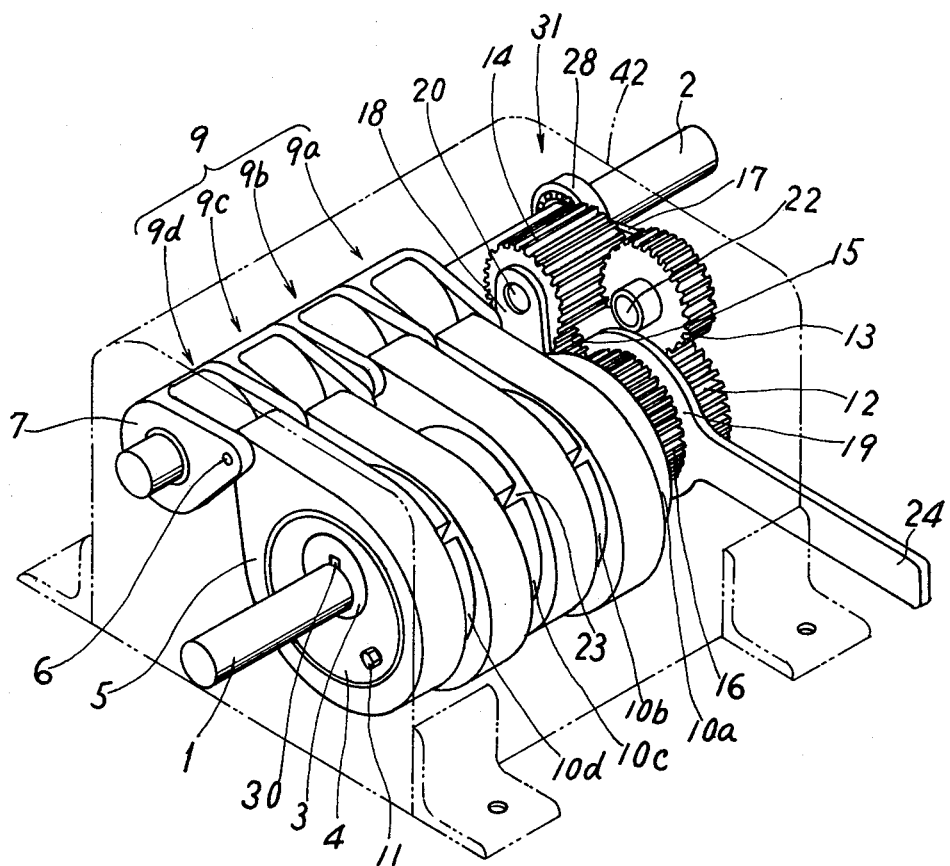
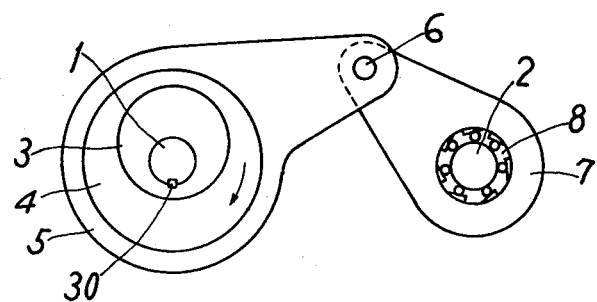
FIG. 2
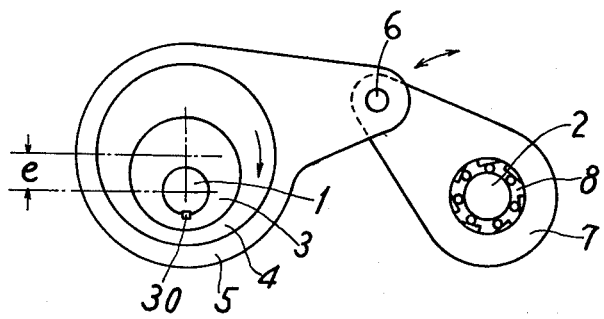
FIG. 3

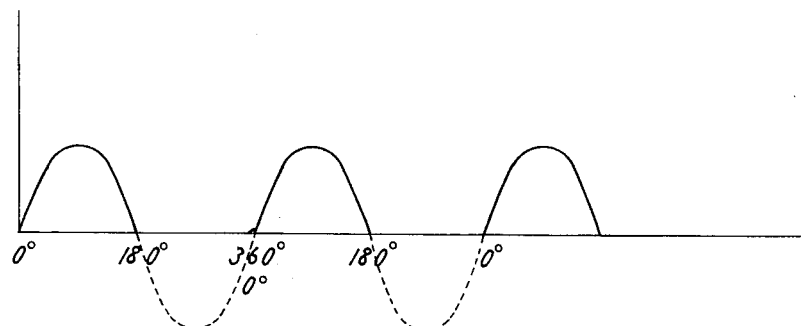
FIG. 4
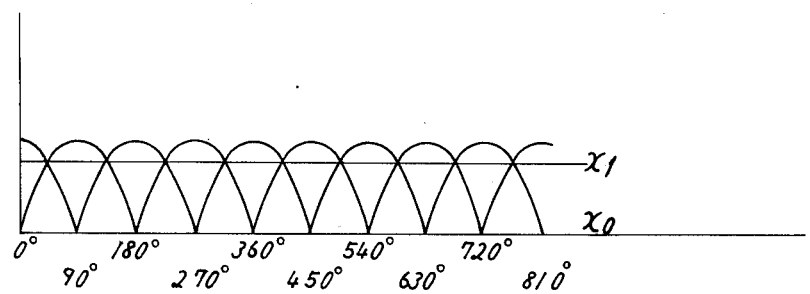
FIG. 5
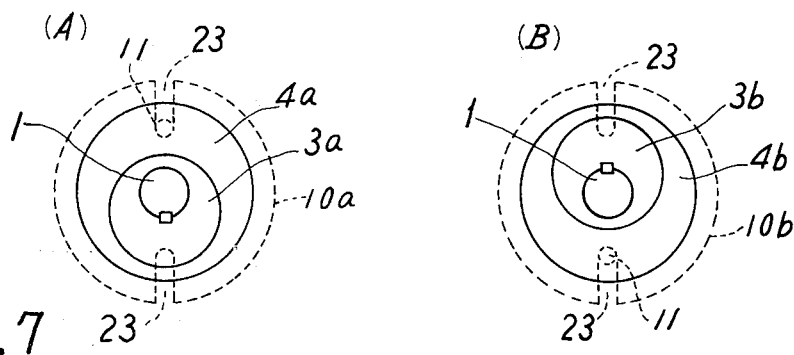
FIG. 6
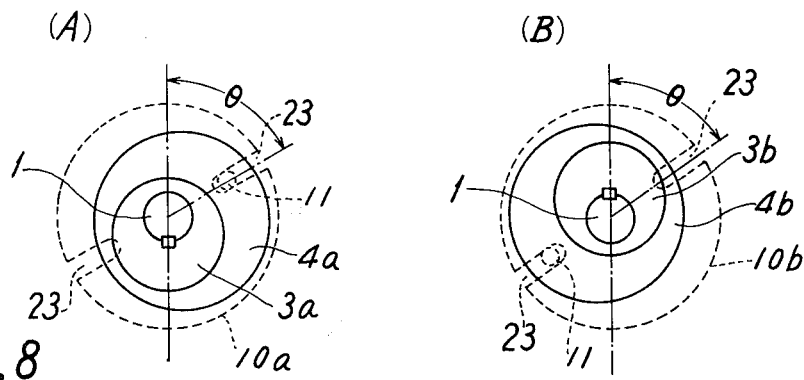
FIG. 7
FIG. 8
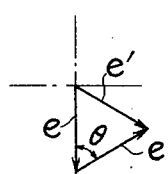
(A)
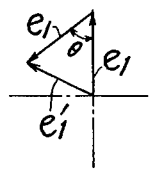
(B)

VARIABLE SPEED POWER TRANSMISSION

This invention relates to a variable speed power transmission provided with rotary units which are mounted on an input axis and an output axis in parallel with each other, with a phase angle difference therebetween, more particularly, to a variable speed power transmission wherein a connecting link on the input side has an extended connecting rod through a double eccentric cam; a connecting link on the output side has a connecting rod through a one-way rotary clutch; both connecting links are rotatably connected by means of a connecting pin; synchronous slit plates are provided at the input side, the first slit plate of which is linked with a phase angle regulating mechanism whereby synchronous slit plates are rotated so as to regulate the eccentric quantity of rotary units.

We have previous instances of the variable speed power transmission in which rotary units with a phase angle difference therebetween are mounted between the input axis and the output axis which are in parallel with each other. U.S. Pat. No. 2,691,896 is an example, wherein an eccentric cam is used on the input axis side and a connecting link is connected to both the connecting links on the input axis side and on the output axis side, to which a phase angle regulating mechanism is linked. Under such arrangement, it is inevitable that a space between the input axis and the output axis is larger and the mechanism itself is complicated. Moreover, it is substantially difficult to effect regulation of speed from the stage of zero rotation. Another example is the variable speed power transmission wherein the eccentric quantity is changed by using a double eccentric cam. This type of mechanism is sometimes used in the automatic screw cutting machine, the internal grinding machine, etc. Although this mechanism is low in r.p.m. of the cam itself and the unbalance of vibration to be caused in negligible, at high speed rotation vibration is too large to put the mechanism to practical use.

In view of the above-mentioned defects of the conventional variable speed power transmission, the present invention has for an object to provide a variable speed power transmission which works in balance and involves slight vibration even in high speed running, is simple in mechanism, can regulate r.p.m. from the stage of zero rotation and is applicable to the regulation of dislocation of the variable fluid pump, metering pump, vibration tester, variable indexing mechanism, roll feed of press, and so on.

The composition of the present invention is explained below, with reference to the preferred embodiments and attached drawings.

FIG. 1 to FIG. 12 relate to Embodiment No. 1 and FIG. 13–FIG. 17 relate to Embodiment No. 2, in which FIG. 1 is a perspective view of the variable speed power transmission, with its cover and machine frame broken away.

FIG. 2 and FIG. 3 are respectively a side elevation showing that the composite eccentric quantity of the rotary units is zero or in the maximum state.

FIG. 4 and FIG. 5 show respectively the output of the rotary unit.

FIG. 6 is a side elevation showing the relationship between the cam and the synchronous slit plate and also showing that the composite eccentric quantity is 0 and (A) and (B) are different in phase by 180°

FIG. 7 (A) and (B) show respectively that the phase advance by $\theta$ angle from the state of (A) and (B) in FIG. 6.

FIG. 8 (A) and (B) show respectively an explanation on the eccentric quantity.

Figure 9:
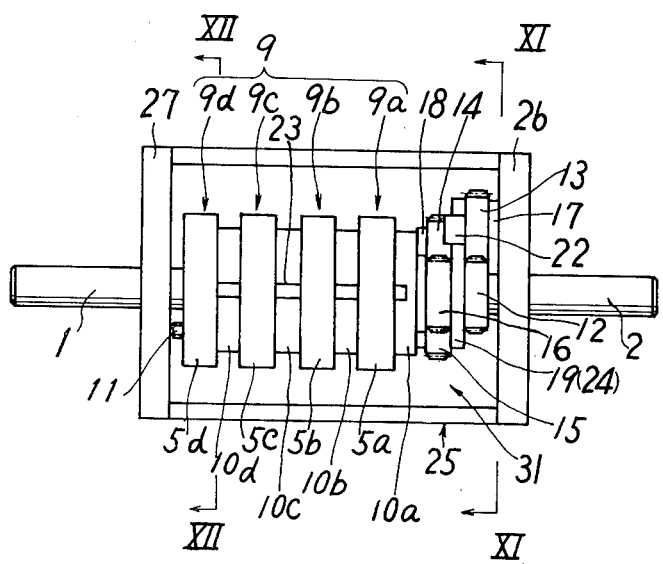

FIG. 9 is a front view of the variable speed power transmission, with its cover taken away.

Figure 10:
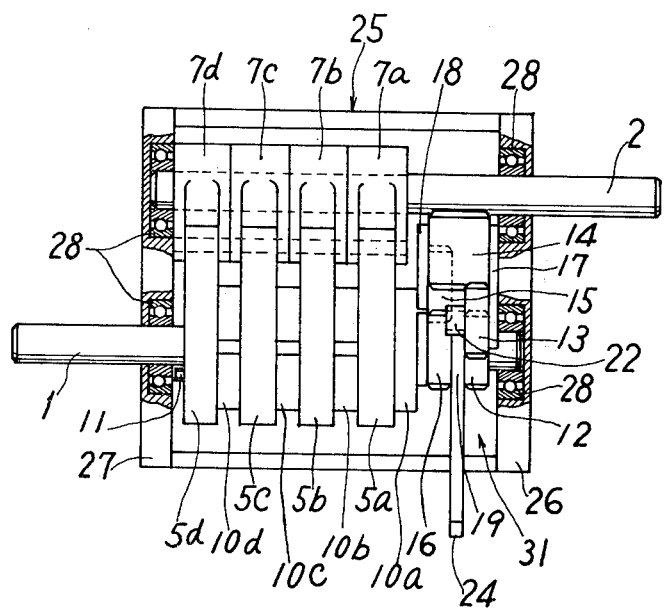

FIG. 10 is a top plan view of FIG. 9.

Figure 11:
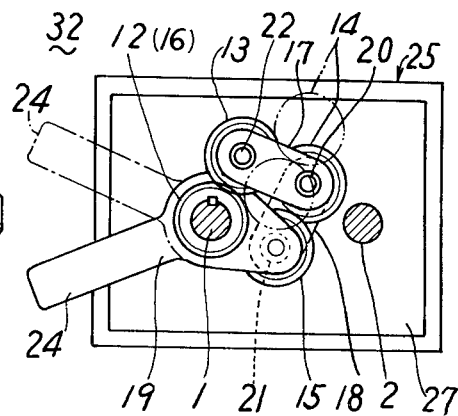

FIG. 11 is a side view, taken along the line XI — XI in FIG. 9.

Figure 12:
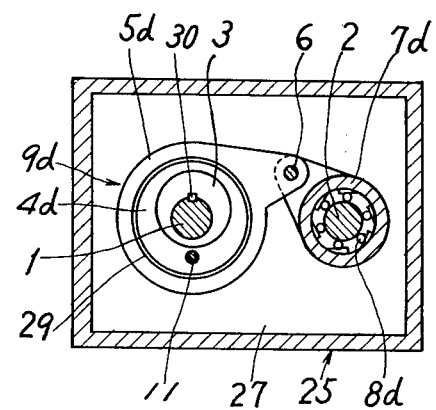

FIG. 12 is a cross section, taken along the line XII — XII in FIG. 9.

Figure 13:
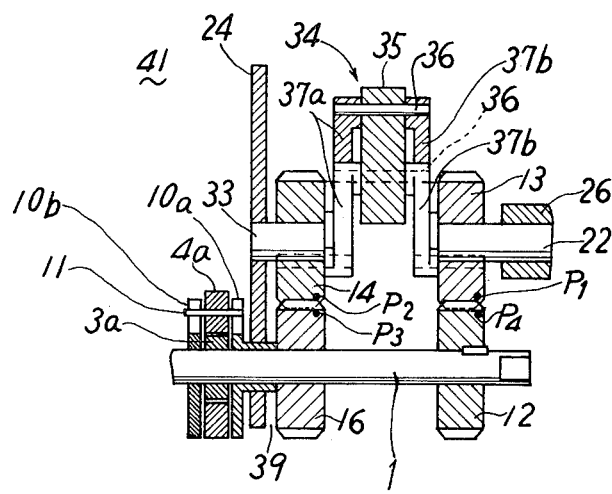

FIG. 13 is a front view of the phase regulating mechanism to which Schmidt coupling is applied.

Figure 14:
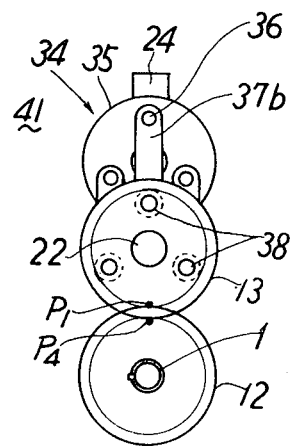

FIG. 14 is a right side view of FIG. 13.

Figure 15:
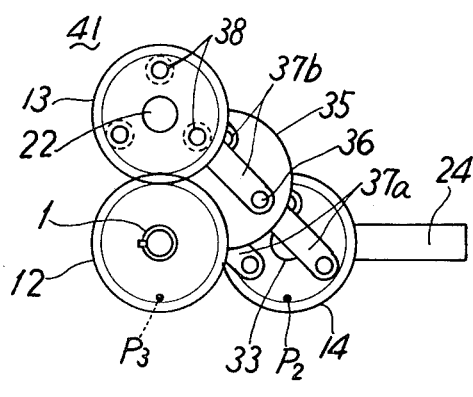

FIG. 15 shows the state in which the state in FIG. 14 was advanced by 180° in phase to make the eccentric quantity maximum.

Figure 16:
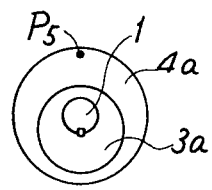
Figure 17:
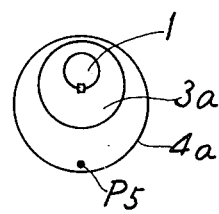

FIG. 16 and FIG. 17 are respectively a diagram illustrating the state of the cam shown in FIG. 14 and FIG. 15 respectively.

Embodiment No. 1

Firstly, an explanation is made below on the construction and operation of one of the rotary units which are the basis of the variable speed power transmission according to the present invention. FIG. 2 shows one of the states of a rotary unit 9 when the eccentric quantity of an inner eccentric cam 3 and an outer eccentric cam 4 is zero. FIG. 3 shows the state in which the eccentric quantity reached the maximum extent when both the eccentric cam 3 and the eccentric cam 4 advanced respectively by a phase angle of 180° (in a clockwise direction) from the state shown in FIG. 2. Secured to an input axis 1 through a key 30 is the inner eccentric cam 3, on the periphery of which the outer eccentric cam 4 is fixed rotatably. To the periphery of said outer eccentric cam 4 a hole made at one end of a connecting link 5 on the input side is fixed rotatably. A clutch 8 of one-way rotary mechanism is fixed to the periphery of the output axis 2. To the periphery of said one-way rotary mechanism 8 is fixed a hole made at one end of a connecting link 7 on the output side. The connecting links on the input side and on the output side are connected with each other at their respective one end by means of a connecting pin 6. In the state where the eccentric quantity is zero as shown in FIG. 2, even if the input axis 1 rotates, neither of the connecting link 5 on the input side and the connecting link 7 on the output side moves and naturally the output axis 2 does not rotate. Suppose the eccentric quantity of the inner eccentric cam 3 and of the outer eccentric cam 4 from the above-mentioned state is "e" as shown in FIG. 3, the eccentric quantity "e" or the composed eccentric quantity of the two will be $$e' = 2e \sin \theta/2$$

if the phases of the inner eccentric cam 3 and the outer eccentric cam 4 advance by a $\theta$ angle from the stage of zero eccentric quantity and where the $\theta$ angle is 180°, the eccentric quantity will be 2e or the maximum. If the composite eccentric quantity becomes $e'$ from the stage of zero with the advance of the phases of the inner eccentric cam 3 and the outer eccentric cam 4, the connecting pin 6 does a rotatory reciprocating motion, with the output axis 2 as a center, whereby the output axis 2 rotates only in one direction. The relationship between the rotation angle of the input axis 1 and the r.p.m. of the output axis 2 is as shown by FIG. 4, in which the area defined by an oblique line represents the rotation angle and its curves resemble the sine curves. The r.p.m. of the output axis of the ordinate is proportional to the composite eccentric quantity $e'$.

The construction and action of the rotary unit 9 is as mentioned above. An explanation is made below on the example of 4 sets of rotary unit 9. If 4 sets of rotary unit 9a, 9b, 9c, 9d are mounted on one and the same input axis 1 and one and the same output axis 2, with a phase angle difference of 90° between cams, the relationship between the input axis rotation angle and the output axis revolution speed in each of rotary units 9a, 9b, 9c, 9d is as shown by FIG. 5, namely, the output is represented by the composite output axis rotation speed curves above $x_1$ line and thus it pulses. However, with the increase in the number of rotary units, pulse becomes smaller and no trouble is given practically, excepting the case of special use.

Next, an explanation is made below on the step of maintaining the rotation balance of the rotary units 9a, 9b, 9c, 9d. As shown by FIG. 6 (for the purpose of simplification, symbols a, b, c, d were given to each inner eccentric cam 3 and each outer eccentric cam 4 of the rotary units 9a, 9b, 9c, 9d respectively), the positions of 3b and 4b relative to the inner eccentric cam 3a and the outer eccentric cam 4a respectively, when the composite eccentric quantity $e'$ is zero, is differentiated by a phase angle of 180°. For this purpose, synchronous slit plates 10a, 10b, 10c, 10d are adjoined to rotary units 9a, 9b, 9c, 9d respectively and are rotatably supported by the input axis 1. A synchronous pin 11 is slidably fixed in slits 23 made oppositely on the diametrical line of the synchronous slit plate to pin-connect the 1st synchronous slit plate 10a, the outer eccentric cam 4a and the 2nd synchronous slit plate 10b. Similarly, 10b, 4b and 10c . . . are pin-connected. FIG. 7 shows that the phase advanced by a $\theta$ angle from the state as shown by FIG. 6. At this time, eccentric quantity $e_1'$ is as shown by FIG. 8 (A). Since the composite eccentric quantities $e'$ and $e_1'$ are the same in value but quite contrary to each other in the direction, static balance is maintained.

In the case where a plurality of rotary units are used, in consideration of the balance of axial direction phase differences between 9a and 9b, between 9a and 9c and between 9a and 9d are made 180°, 90°, and 270° respectively.

Referring to the overall composition of the variable speed power transmission mechanism 32 of the present invention, the following explanation is made. The input axis 1 and the output axis 2 are supported on both sides by ball bearings 28 fixed to side plates 26, 27 of a machine frame 25. Rotary units 9a, 9b, 9c, 9d are mounted on both axes 1, 2 as mentioned above. Synchronous slit plates 10a, 10b, 10c, 10d are rotatably supported, adjacent the respective rotary units, on the input axis 1. The 1st gear 12 is secured to the input axis 1. The 2nd gear 13 (the 1st idle gear) which engages the 1st gear 12 is supported by a fixed axis 22 secured to the side plate 26. The 3rd gear 14 (a long pinion having a large width) which engages the 2nd gear is rotatably supported by the 1st movable axis 20 secured to the 1st link for gear 17. The other end of said axis is fixed rotatably in an axial hole made at one end of the 2nd link 18 and an axial hole made at the other end of said 1st link is fixed rotatably to the afore-mentioned fixed axis 22. The 4th gear 15 which engages the 3rd gear 14 is rotatably fixed in an axial hole made at one end of a link for speed change 19 and the other end portion of said link for speed change is supported rotatably by the input axis 1. A variable speed lever 24 is extended from said other end portion. The 4th gear 15 engages the 5th gear 16. For former is supported rotatably by the input axis 1 and is secured to the 1st synchronous slit plate 10a. All of the above-mentioned gears are the same in diameter and in the number of teeth but may be different in the length of pinion.

The above-mentioned 1st gear 12 to the 5th gear 16, synchronous slit plates 10a, 10b, 10c, 10d and links 17, 18, 19 compose a phase regulating mechanism 31 which regulates the eccentric quantity. Numeral 29 denotes oil-less bearing and numeral 42 denotes a cover.

An explanation is made below with regard to the operation of the above-mentioned phase regulating mechanism 31. In FIG. 11, if the 1st link 17 for gear is turned around the fixed axis 22 by 45°, the 3rd gear 14 turns by 90°. Similarly if the link for speed change 19 is turned around the input axis 1 by 45°, the 4th gear 15 turns by 90°. When the lever 24 for speed change which rotates the link for speed change 19 is in a downward position as shown by a solid line and the composite eccentric quantity $e'$ of rotary units 9a, 9b, 9c, 9d is zero, if the lever for speed change 24 is turned by 45° to have it take an upward position as shown by a chain line, the 4th gear 15 turns by 90° and also the 3rd gear 14 linking with the 2nd link 18 turns by 90°. As a result, the phase angle difference of 180° takes place between the 1st gear 12 and the 5th gear 16, whereby synchronous slit plates 10a, 10b, 10c, 10d and outer eccentric cams 4a, 4b, 4c, 4d are rotated by 180° and consequently the composite eccentric quantity $e_1'$ reaches its maximum $2e$. Thus, even while the input axis 1 is rotating, the lever for speed change 24 can be regulated freely to the desired position. When the inner and outer eccentric cams 3a . . . and 4a . . . are regulated in phase angle, the fixed rotation can be transmitted from the input axis 1 to the output axis 2 by means of the composite eccentric quantity of such phase angles.

Embodiment No. 2.

This is an embodiment in which the phase regulating mechanism of Embodiment No. 1 is varied and to which Schmidt coupling is applied. Only the phase regulating mechanism and the diagram to express the eccentric quantity are shown in FIG. 13 to FIG. 17 for Embodiment No. 2, in which like reference numbers are employed to designate like parts throughout Embodiments No. 1 and No. 2 but different reference numbers are used for different parts. The 1st gear 12 is secured to the input axis 1 and the 2nd gear 13 is supported rotatably by the fixed axis 22 which engages the 1st gear 12 and is secured to the side plate 26. The 5th gear 16 is supported rotatably by the input axis 1 and the 3rd gear 14 which engages the 5th gear 16 is supported rotatably by a movable axis 33 secured to the variable speed lever 24. An end portion of said variable speed lever is provided in such a fashion that it can turn around the input axis 1 in a gap 39 made between the 5th gear and the synchronous slit plate 10 secured thereto. The 2nd gear 13 and the 3rd gear 14 are connected with each other through the medium of the Schmidt coupling 34. An end of each of crank pin 37 of respective pin 36 protruding toward both sides, at three portions of an intermediate disc 35, is supported rotatably by said Schmidt coupling and the other end of each said crank pins 37 is supported by pins 38 protruded to the side of the 2nd gear 13 and the side of the 3rd gear 14. The composition of the outer eccentric cam 4a connected to the 1st synchronous slit plate 10a which is connected to the 5th gear, the succeeding synchronous slit plate 10b, the synchronous pin 11, etc. is the same as Embodiment No. 1. A phase regulating mechanism 41 of this embodiment consists of the above-mentioned composition and the rotary unit portion is quite the same as that of Embodiment No. 1.

Referring to the operation of the above-mentioned mechanism, FIG. 13 and FIG. 14 show respectively the state of the 1st gear to the 5th gear when the variable speed lever 24 is in an upright position (phase angle - 0°). When the 1st gear 12 rotates, the 5th gear 16 also rotates in the same direction and at the same r.p.m. as the 1st gear. If, in this case, points P1–P4 are provided on each gear and the point P5 is provided on the outer eccentric cam 4a (FIG. 16) and the variable speed lever 24 is turned by 90° while the 1st gear 12 is fixed, points P1 and P4 do not move because the 1st gear is fixed. The point $P_2$ is positioned as shown in FIG. 15 when the 2nd gear 13 and the 3rd gear 14 move in parallel with each other. The point P3 on the 5th gear 16 engaging the 3rd gear 14 turns by 180°. At this time, the point P5 on the outer eccentric cam 4a is positioned as shown in FIG. 17 and the composite eccentric quantity reaches the maximum $e'$. If, in this state, the 1st gear 12 is rotated, it rotates in such state as shown in FIG. 17 and thus the rotational direction and the r.p.m. of the 5th gear 16 and the outer eccentric cam 4a becomes the same as those of the 1st gear 12.

Since the present invention has the above-mentioned construction and performance, its rotary units can increase the eccentric quantity by means of a double eccentric cam and also can set the outer eccentric cam at a given phase angle by connecting a plurality of synchronous slit plates with a plurality of rotary units by means of synchronous pins at the outer eccentric cam and at the same time can facilitate the maintenance of static balance. Moreover, by connection of the phase regulating mechanism of the variable speed power transmission needs not be stopped while working. By the manipulation of a variable speed lever, it is possible to change the eccentric quantity by regulating the phase of cam properly. Thus, the present invention affords very high workability and is comparatively simple in construction and cheep in cost.

What is claimed is:

1. In a variable speed power transmission having a rotary unit comprising an inner eccentric cam secured to an input axis, an outer eccentric cam mounted on the periphery of said inner eccentric cam, a connecting link on the input side having at its one end a round hole rotatably fitted to the periphery of said outer eccentric cam, a one-way rotary mechanism fixed to the output axis, a connecting link on the output side with its one end fixed to the periphery of said one-way rotary mechanism; the other end portions of said connecting links on the input side and on the output side are connected rotatably with each other by means of a connecting pin, a plurality of sets of said rotary units with a phase angle difference therebetween are mounted on said input axis and said output axis with the fixed space therebetween, a synchronous slit plate with a slit in diametrical direction is rotatably fixed to the input axis and adjacent each outer eccentric cam, said synchronous slit plate, the outer eccentric cam and a succeeding synchronous plate are connected together by a synchronous pin through an axial hole in the outer eccentric cam and a slit of each synchronous slit plate, and a phase angle regulating mechanism including a gear rotatable with said input axis, a gear rotatable about said input axis and secured to one said synchronous slit plate, a variable eccentric gear train drive from said gear rotatable with said input axis to said rotatable about said input axis including a drive gear with a fixed axis driven by said gear rotatable with said input axis, a variable speed lever rotatable about said input axis, a moveable eccentric drive means and linkages linked to said variable speed lever to move said gear rotatable about said input axis to change its phase.

* * * * *